United States Patent [19]

do Espirito Santo

[11] Patent Number: 5,337,188
[45] Date of Patent: Aug. 9, 1994

[54] MOTOR VEHICLE REARVIEW MIRROR APPARATUS MOUNTABLE INTERCHANGEABLY ON THE RIGHT OR LEFT SIDE OF THE MOTOR VEHICLE

[75] Inventor: Antonio F. do Espirito Santo, Sao Paulo, Brazil

[73] Assignee: Metagal Industria E Comercio Ltda., Sao Paulo, Brazil

[21] Appl. No.: 926,846

[22] Filed: Aug. 6, 1992

[30] Foreign Application Priority Data

Aug. 12, 1991 [BR] Brazil .................. MU 7101792

[51] Int. Cl.$^5$ .................. G02B 7/182; G02B 7/18; B60R 1/06
[52] U.S. Cl. .................. 359/872; 359/841; 248/479
[58] Field of Search .................. 359/838, 842, 844, 871, 359/872, 841, 873, 881; 248/475.1, 476, 477, 479, 471

[56] References Cited

U.S. PATENT DOCUMENTS 4,394,066 7/1983 Sharp .................. 359/872
4,991,814 2/1991 Schmidt et al. .................. 359/872

*Primary Examiner*—Loha Ben
*Assistant Examiner*—Darryl J. Collins
*Attorney, Agent, or Firm*—Michael J. Striker

[57] ABSTRACT

The rearview mirror apparatus includes a mounting base, a body holding a mirror and having an end face fitting a face of the base; and a reversible assembly mounting device for connecting the body to the mounting base including two female connecting elements positioned symmetrically on the end face of the body near respective opposing lateral edges of the end face and two corresponding male connecting elements on the base face of the mounting base positioned and structured for coupling with the female connecting elements; and an attaching device for attaching the body to the mounting base including a fixing screw, a threaded hole provided in the end face of the body near each of the female connecting elements and a hole provided in the base in the vicinity of one of the male connecting elements, so that, when the male connecting element provided with the hole is positioned to engage one of the female elements, the fixing screw can be inserted through the hole and screwed into the threaded hole associated with the female connecting element. Each female connecting element includes a narrow oblong entrance in the body having a longitudinal axis perpendicular to the longitudinal axis of the body, and a comparatively enlarged bottom portion connected to the oblong entrance. The threaded hole in each of the female connecting element is located in the bottom portion.

4 Claims, 2 Drawing Sheets

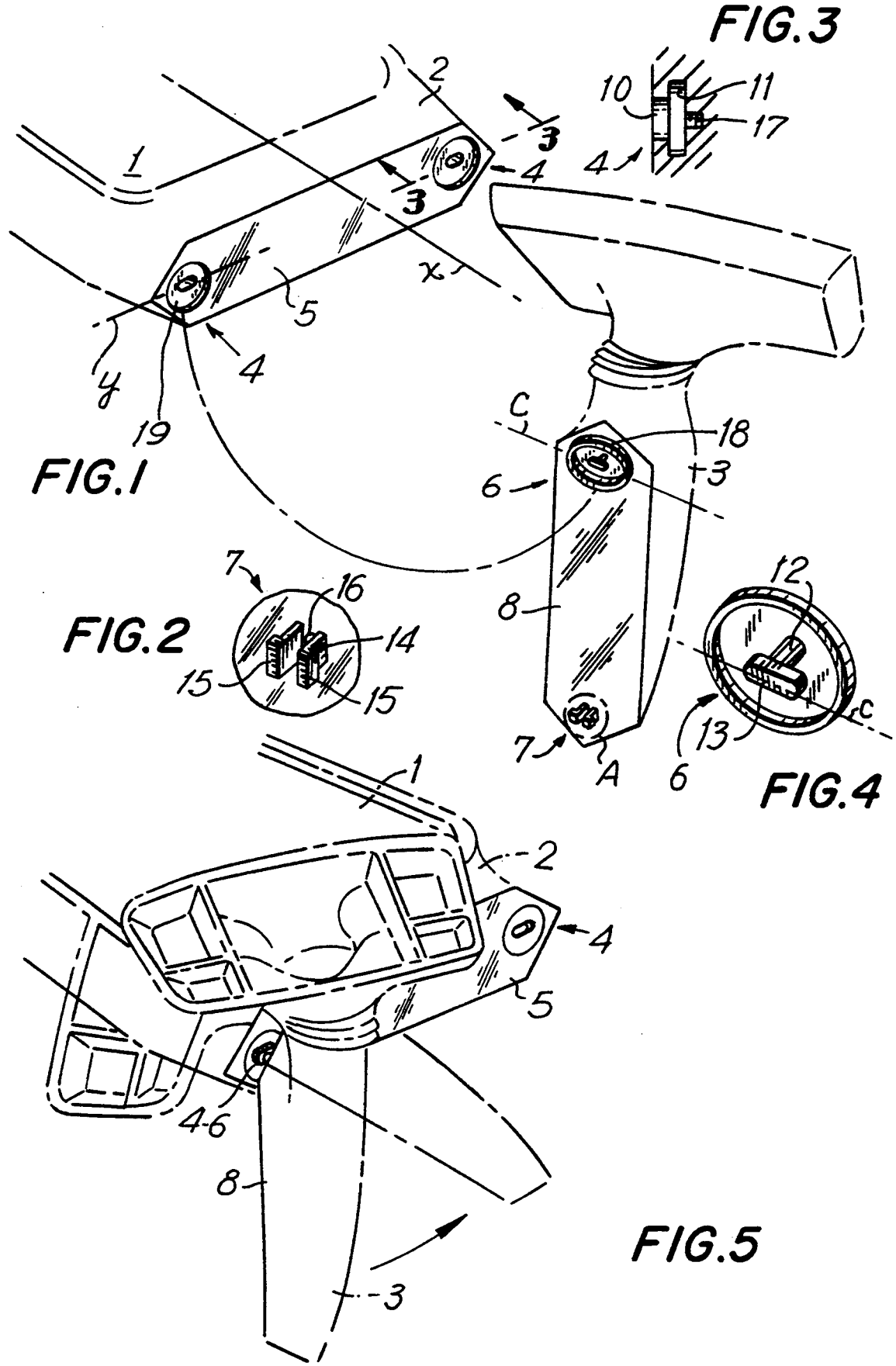

MOTOR VEHICLE REARVIEW MIRROR APPARATUS MOUNTABLE INTERCHANGEABLY ON THE RIGHT OR LEFT SIDE OF THE MOTOR VEHICLE

BACKGROUND OF THE INVENTION

The present invention relates to motor vehicle accessories and, more particularly, to an externally mounted rearview mirror for a motor vehicle, particularly an automobile.

Externally mounted motor vehicle rearview mirrors are known including a mirror element held in a body attached to a mounting base on the motor vehicle body, whose structure permits mounting on either the right or the left side of the motor vehicle.

The known rearview mirrors of this type however have a structure which is not entirely satisfactory, because they are either too complex or they do not have the desired stability, because of the conditions under which they are used.

SUMMARY OF THE INVENTION

It is an object of the present invention to provide an improved externally mountable, reversible assembly rearview mirror of the above described type, which is simpler and does not have the disadvantages of the known rearview mirror apparatus of this type. By "reversible assembly" we mean an assembly which can be mounted on either the right or the left hand side of the motor vehicle.

According to the invention, the rearview mirror apparatus for a motor vehicle, comprises a mounting base attachable to the motor vehicle and having a base face; a body having a longitudinal "X" axis and an end face attachable to the mounting base with the base face engaging the end face; a mirror element held in the body; reversible assembly connecting means for the body and the mounting base. The connecting means comprises two female connecting elements on the end face of the body engageable with the base face of the mounting base and two corresponding male connecting elements on the base face of the mounting base positioned and structured for coupling with the female connecting elements to hold the body on the mounting base; and attaching means for attaching the body to the mounting base including a fixing screw and a threaded hole provided in the end face of the body in the vicinity of each of the female connecting elements and a hole provided in the base in the vicinity of one of the male connecting elements, so that, when the male connecting element provided with the hole is positioned to engage one of the female elements, the fixing screw can be inserted through the hole and screwed into the threaded hole associated with the female connecting element.

The structure of the connecting means according to the invention overcomes the disadvantages of the prior art reversible assembly rearview mirror apparatus. This structure simplifies the assembly and manufacture of reversible assembly rearview mirror apparatus used in motor vehicles. Once mounted the rearview mirror apparatus according to the invention provides a safe linkage between parts able to withstand vibrations, bumps and other stresses and strains that a rearview mirror mounted on the side of the vehicle body experiences.

BRIEF DESCRIPTION OF THE DRAWING

The objects, features and advantages of the present invention will now be illustrated in more detail by the following detailed description, reference being made to the accompanying drawing in which:

FIG. 1 is an exploded perspective view of a rearview mirror apparatus according to the invention showing the method of attaching the body to the mounting base;

FIG. 2 is a detailed perspective view of a male connecting element of the rearview mirror apparatus of FIG. 1 shown in the circled portion A of FIG. 1;

FIG. 3 is a detailed cross-sectional view of a female connecting element of the rearview mirror apparatus of FIG. 1 taken along section line 3—3 in FIG. 1;

FIG. 4 is a detailed perspective view of another male connecting element of the rearview mirror apparatus of FIG. 1 shown in the circled portion C of FIG. 1;

FIG. 5 is a perspective view showing a step in the assembly of the rearview mirror apparatus of FIG. 1;

DETAILED DESCRIPTION OF THE PREFERRED EMBODIMENT

Figure 6:
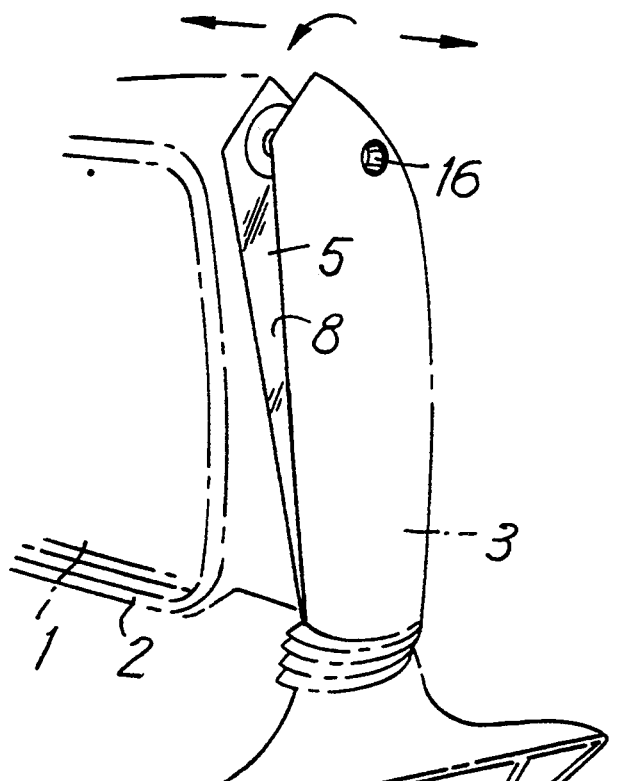
FIG. 6 is a perspective view showing another step in the assembly of the rearview mirror apparatus of FIG. 1.

An externally mounted rearview mirror apparatus according to the invention, which can be mounted on the right or left side of the motor vehicle, is shown in the drawing. The rearview mirror apparatus shown in FIG. 1 comprises a body 2, a mirror element 1 held in the body 2 and a mounting base 3 to which the body 2 with the mirror element 1, advantageously a flat mirror plate, is fixed by a connecting means according to the invention.

The reversible assembly connecting means according to the preferred embodiment comprises two female connecting elements 4 on end face 5 of the body 2 engageable with two corresponding male connecting elements 6,7 on base face 8 of the mounting base 3. Two corresponding male connecting elements 6,7 on the base face 8 of the mounting base 3 are positioned for coupling with the female connecting elements 4 when the body 2 is connected with the mounting base 3. The two female connecting elements 4 are located in the vicinity of opposing lateral edges of the end face 5. The two female connecting elements 4 are also positioned symmetrically on opposite sides of a longitudinal axis "X" of the body 2. One of the male connecting elements 6 can be a bayonet pin and the other 7 can be a locking element. Finally a fixing screw 9 is provided for securing the body 2 to the mounting base 3.

As shown in FIG. 3, each female connecting element 4 is formed by a narrow oblong entrance 10, whose longitudinal axis "y" as seen in FIG. 1 is perpendicular to the longitudinal "x" axis of the body 2, and a comparatively enlarged bottom portion 11 connected to the oblong entrance 10.

Male connecting element 6, the bayonet pin, comprises a narrower stem 12 and an oblong comparatively enlarged head 13 attached to the top of the stem 12. The stem 12 has a diameter dimensioned so that it can be received by the entrance or opening 10 of the female connecting elements 4 and which has a length such that it is similar to the depth of the entrance 10. The oblong enlarged head 13 is dimensioned so that it can pass through the oblong entrance 10 and enter and be held in the enlarged bottom portion 11. The oblong enlarged head 13 has its longitudinal axis "c" perpendicular to the longitudinal axis "y" of the openings 10.

Male connecting element 7, the locking element, is formed by two similarly resilient and parallel pieces 14,15 positioned to be pressed together under pressure in either of the female connecting elements 4. This is shown in FIG. 2. Each of the pieces 14, 15 has a lower shank member 114 and a head member 115 attached to the shank member. The depth of the entrance 10 is similar to the length of the lower shank member 114 from the base face 8 to the head member 15.

The mounting base 3 is provided with a hole 16 which extends through the base 3 and between the two pieces 14,15. The screw 9 is inserted in the hole 16 during assembly and engages in the threaded hole 17 at the bottom of the bottom portion 11 of either of the female connecting elements 4.

An additional connecting means can be provided by a circular protruding rim 18 around the male connecting element 6 which engages in a corresponding circular recessed portion 19 about either of the female connecting elements 4.

During assembly and mounting on the left hand side of the motor vehicle body, the enlarged head 13 of the male connecting element 6 is engaged in the entrance 10 of the female connecting element 4 on the end face 5 of the body 2. This is shown with the mirror element 1 facing upward in FIG. 5. The enlarged head 13 is inserted further until it reaches and engages in the enlarged bottom portion 11 of the female connecting element 4.

Then the mounting base 3 is rotated 90° relative to the body 2, as shown in FIG. 6, using the female connecting element 4 and the enlarged head 13 engaged with it as a pivot point or fulcrum until the other female connecting element 4 can be engaged with the other male connecting element 7. Then the locking element is engaged in the other female connecting element 4 pressing the head members 115 of the two pieces 14,15 together until those head members 115 sit in the bottom portion 11 at which time the two pieces, because of their resiliency, spread apart again. At this point the mounting base 3 is connected and held on the body 2 with the mirror element 1.

Figure 7:
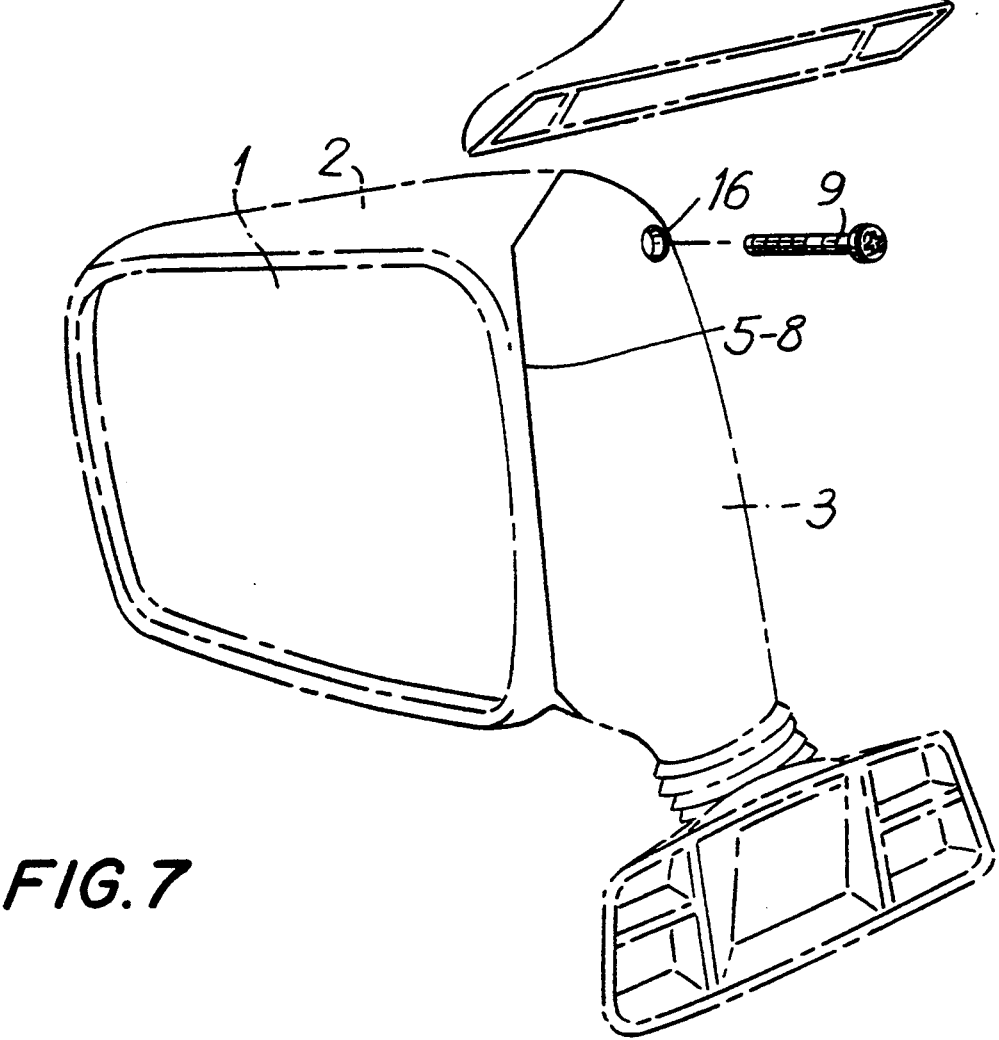
FIG. 7 is a perspective view showing a final step in the assembly of the rearview mirror apparatus of FIG. 1.

Finally in the last step shown in FIG. 7 the fixing screw 4 is inserted in the hole 16 and screwed into the threaded hole 17 at the base of female connecting element 4.

To assemble the same rearview mirror apparatus on the right side of the vehicle, the male connecting element 6 is coupled with the female connecting element 4 on the other side of the end face 5 of body 2 from that shown in FIG. 2. This is the reverse of the method of coupling shown in FIG. 2.

The reversible assembly connecting means according to the invention can be used in externally mounted rearview mirrors with any type of configuration and finish.

While the invention has been illustrated and embodied in an improved externally mounted rearview mirror apparatus for a motor vehicle mountable on the right or left side of the motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed is new and desired to be protected by Letters Patent is set forth in the appended claims.

I claim:

1. A rearview mirror apparatus for a motor vehicle, comprising:

a mounting base attachable to the motor vehicle and having a base face;

a body having a longitudinal "X" axis and an end face attachable to the mounting base with the base face engaging the end face;

a mirror element held in the body;

reversible assembly connecting means for connecting the body to the mounting base, said connecting means comprising two female connecting elements on the end face of the body engageable with the base face of the mounting base and two corresponding male connecting elements on the base face of the mounting base positioned and structured for coupling with the female connecting elements to hold the body on the mounting base; and attaching means for attaching the body to the mounting base including a fixing screw and a threaded hole provided in the end face of the body in the vicinity of each of the female connecting elements and a hole provided in the mounting base in the vicinity of one of the male connecting elements, so that, when the male connecting element provided with the hole is positioned to engage one of the female elements, the fixing screw can be inserted through the hole in the mounting base and screwed into the threaded hole in the body associated with the female connecting element; and wherein the female connecting elements are located in the vicinity of respective opposing lateral edges of the end face of the body and are positioned symmetrically on opposite sides of the longitudinal axis "X" of the body and each of the female connecting elements includes a narrow oblong entrances in the body having a longitudinal axis "y" perpendicular to the longitudinal "x" axis of the body, and a comparatively enlarged bottom portion connected to the oblong entrance, and the threaded hole is located in the bottom portion.

2. A rearview mirror apparatus as defined in claim 1, wherein one of the male connecting elements consists of a bayonet pin and another is a locking element, the bayonet pin comprising a stem and an oblong head attached to the stem, the stem having a diameter such that the stem can be received by each of the entrances of the female connecting elements and a length equivalent to a depth of the entrance, and the oblong enlarged head is dimensioned so that the oblong head can fit in the enlarged bottom portion of the female connecting elements, the oblong enlarged head having a longitudinal axis "c" perpendicular to the longitudinal axis "y" of the entrance and the locking element being formed by two similarly resilient and parallel pieces positioned in such away as to be pressed together under pressure in the female connecting elements, each of the pieces comprising a lower shank member and a head member attached to the shank member, the depth of the entrance of the female connecting element corresponding to a length of the lower shank member from the end face to the head member.

3. A rearview mirror apparatus as defined in claim 1, further comprising an additional connecting means, for connecting the body to the mounting base, including a circular protruding rim provided on the mounting base around the bayonet pin and a corresponding circular recessed portion in the end face of the body around each of the female connecting elements, the circular protruding rim being engageable in each of the circular recessed portions of the body.

4. A rearview mirror apparatus for a motor vehicle, comprising
- a mounting base attachable to the motor vehicle and having a base face;
- a body having a longitudinal "X" axis and an end face conforming to the base face and attachable to the mounting base with the base face engaging the end face;
- a mirror element held in the body;
- reversible assembly connecting means for the body and the mounting base, said connecting means comprising two female connecting elements on the end face of the body engageable with the base face of the mounting base and two corresponding male connecting elements on the base face of the mounting base positioned and structured for coupling with the female connecting elements to hold the body on the mounting base; and
- attaching means for attaching the body to the mounting base including a fixing screw and a threaded hole provided in the end face of the body in the vicinity of each of the female connecting elements and a hole provided in the base in the vicinity of one of the male connecting elements, so that, when the male connecting element provided with the hole is positioned to engage one of the female elements, the fixing screw can be inserted through the hole and screwed into the threaded hole associated with the female connecting element, and wherein the female connecting elements are located in the vicinity of respective opposing lateral edges of the end face of the body and are positioned symmetrically on opposite sides of the longitudinal axis "X" of the body and each of the female connecting elements includes a narrow oblong entrance in the body having a longitudinal axis "y" perpendicular to the longitudinal "x" axis of the body and a comparatively enlarged bottom portion connected to the oblong entrance, and the threaded hole is located in the bottom portion, and one of the male connecting elements consists of a bayonet pin and another consists of a locking element, the bayonet pin comprises a stem and an oblong head attached to the stem, the stem having a diameter such that the stem can be received by each of the entrances of the female connecting elements and a length equivalent to a depth of the entrance, and the oblong enlarged head is dimensioned so that the oblong head can fit in the enlarged bottom portion of the female connecting elements, the oblong enlarged head having a longitudinal axis "c" perpendicular to the longitudinal axis "y" of the entrance and the locking element is formed by two similarly resilient and parallel pieces positioned in such away as to be pressed together under pressure in the female connecting elements, each of the pieces comprise a lower shank member and a head member attached to the shank member, the depth of the entrance of the female connecting element corresponding to a length of the lower shank member from the end face to the head member.

* * * * *